United States Patent
Huang et al.

(10) Patent No.: US 7,100,728 B2
(45) Date of Patent: Sep. 5, 2006

(54) DRIVING MECHANISM OF AN ELECTRICALLY-OPERATED VEHICLE

(76) Inventors: Shih-Feng Huang, No. 106, Sec. 2, Yuanlu Rd., Pusin Township, Changhua County (TW); Shih-Yi Huang, No. 106, Sec. 2, Yuanlu Rd., Pusin Township, Changhua County (TW)

( * ) Notice: Subject to any disclaimer, the term of this patent is extended or adjusted under 35 U.S.C. 154(b) by 268 days.

(21) Appl. No.: 10/739,569

(22) Filed: Dec. 19, 2003

(65) Prior Publication Data

US 2005/0133282 A1    Jun. 23, 2005

(51) Int. Cl.
*B60K 1/00* (2006.01)
(52) U.S. Cl. ...................... 180/181; 180/65.1
(58) Field of Classification Search ............... 180/65.1, 180/69.6, 180, 181, 220
See application file for complete search history.

(56) References Cited

U.S. PATENT DOCUMENTS

| | | | | |
|---|---|---|---|---|
| 5,388,659 A * | 2/1995 | Pepe | ........................... | 180/219 |
| 5,775,452 A * | 7/1998 | Patmont | ........................ | 180/181 |
| 6,109,127 A * | 8/2000 | Liau | ........................... | 74/336 B |
| 6,273,205 B1 * | 8/2001 | Tsai | ............................. | 180/181 |
| 6,345,678 B1 * | 2/2002 | Chang | ........................ | 180/181 |
| 6,564,894 B1 * | 5/2003 | Ho | ............................. | 180/228 |
| 6,609,584 B1 * | 8/2003 | Patmont et al. | ............. | 180/220 |
| 6,640,920 B1 * | 11/2003 | Patmont | ........................ | 180/181 |
| 6,752,229 B1 * | 6/2004 | Ho | ............................. | 180/181 |
| 2002/0117343 A1 * | 8/2002 | Kao | ............................ | 180/220 |
| 2003/0085067 A1 * | 5/2003 | Martin | ........................ | 180/181 |

* cited by examiner

*Primary Examiner*—Jeff Restifo
(74) *Attorney, Agent, or Firm*—Alan D. Kamrath; Nikolai & Mersereau, P.A.

(57) ABSTRACT

An electric vehicle includes a rear frame, a rear axle fastened with the rear frame, a rear wheel mounted on the rear axle, and a driving mechanism mounted on the rear frame to drive both ends of the rear axle. The driving mechanism has a first motor for driving one end of the rear axle in conjunction with a first driven member and a first transmission member, and a second motor for driving the other end of the rear axle in conjunction with a second driven member and a second transmission member.

4 Claims, 4 Drawing Sheets

DRIVING MECHANISM OF AN ELECTRICALLY-OPERATED VEHICLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a vehicle operated by electricity, and more particularly to a driving mechanism of the electrically-operated vehicle.

BACKGROUND OF THE INVENTION

The conventional electric vehicle is generally operated by a motor having a relatively small horsepower, with the power source of the motor being a battery set. Such conventional electric vehicle as described above is inefficient at best in terms of performance, especially in an uphill situation. The operational inefficiency of the conventional electric vehicle is attributable to two factors, one of which is the small horsepower of the motor, with the other factor being the fact that only one end of a wheel axle is driven by the motor via a transmission member and a sprocket.

BRIEF SUMMARY OF THE INVENTION

The primary objective of the present invention is to provide an electric vehicle which is free of the operational deficiencies of the prior art electric vehicle described above.

In keeping with the principle of the present invention, the foregoing objective of the present invention is attained by a driving mechanism comprising two motors, two transmission members, and two driven members, which are used to drive both ends of a rear wheel axle. As a result, the operational efficiency and the performance of the electric vehicle of the present invention is significantly enhanced.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
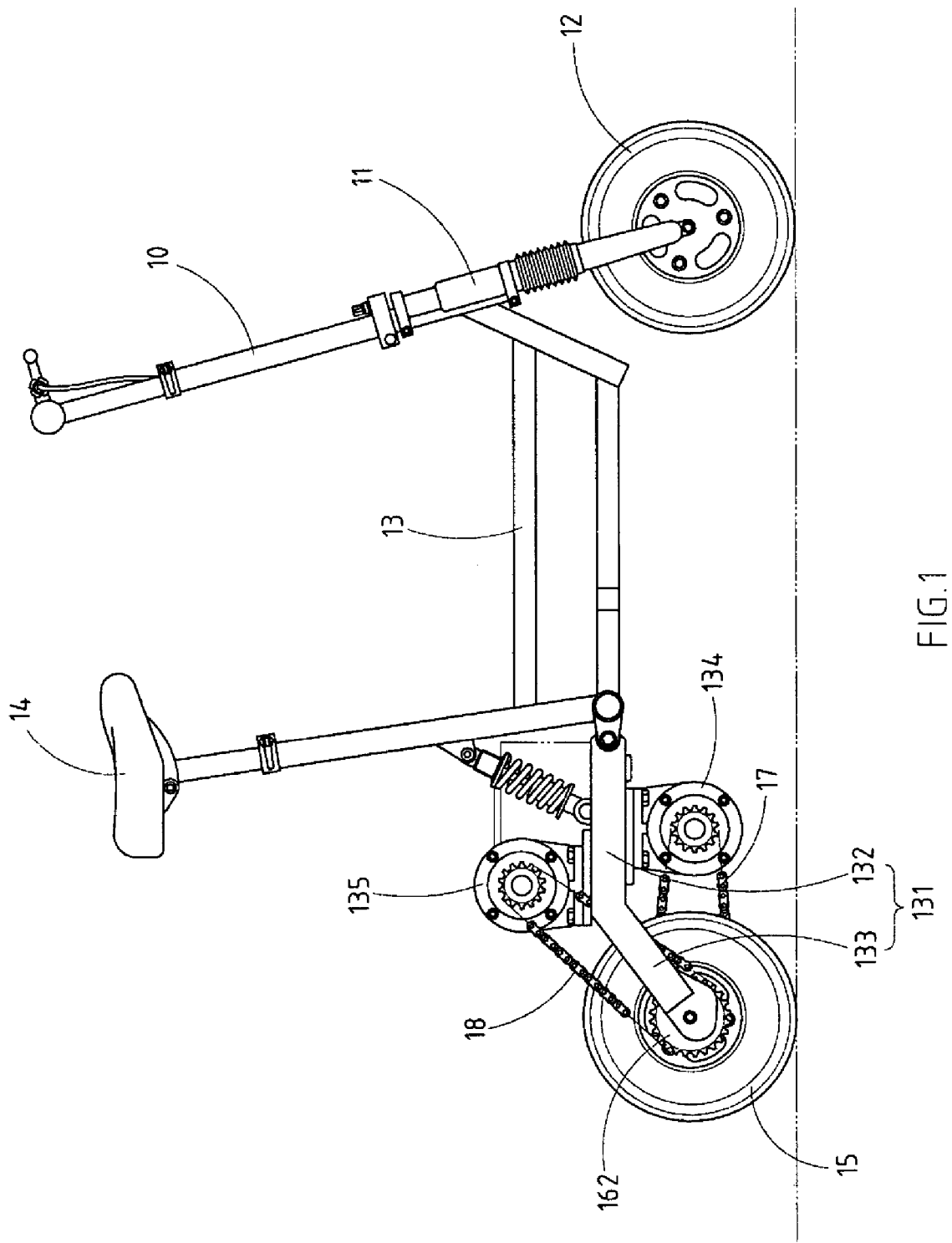
FIG. 1 shows a side schematic view of the preferred embodiment of the present invention.
Figure 2:
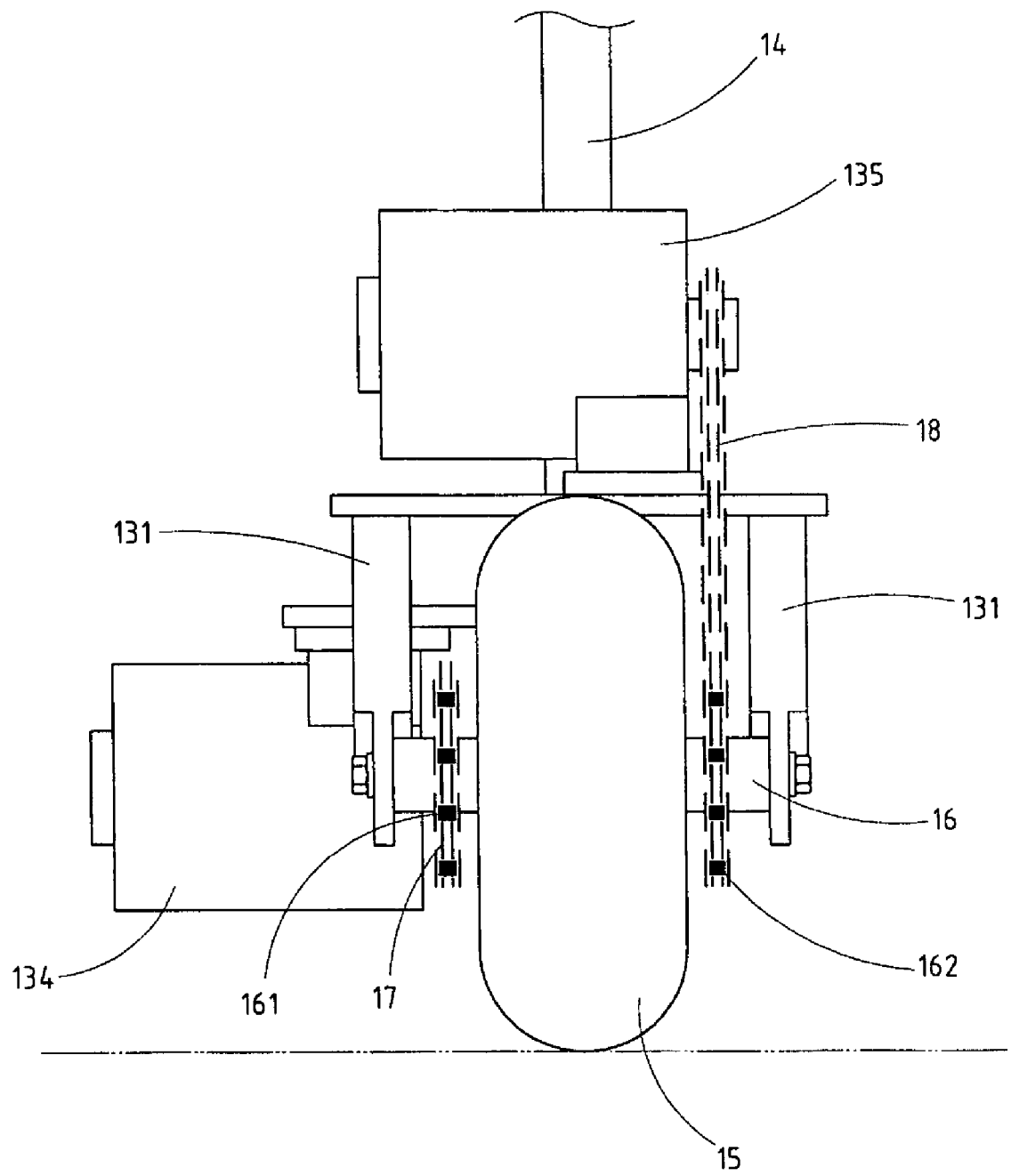
FIG. 2 shows a partial rear side view of the preferred embodiment of the present invention.
Figure 3:
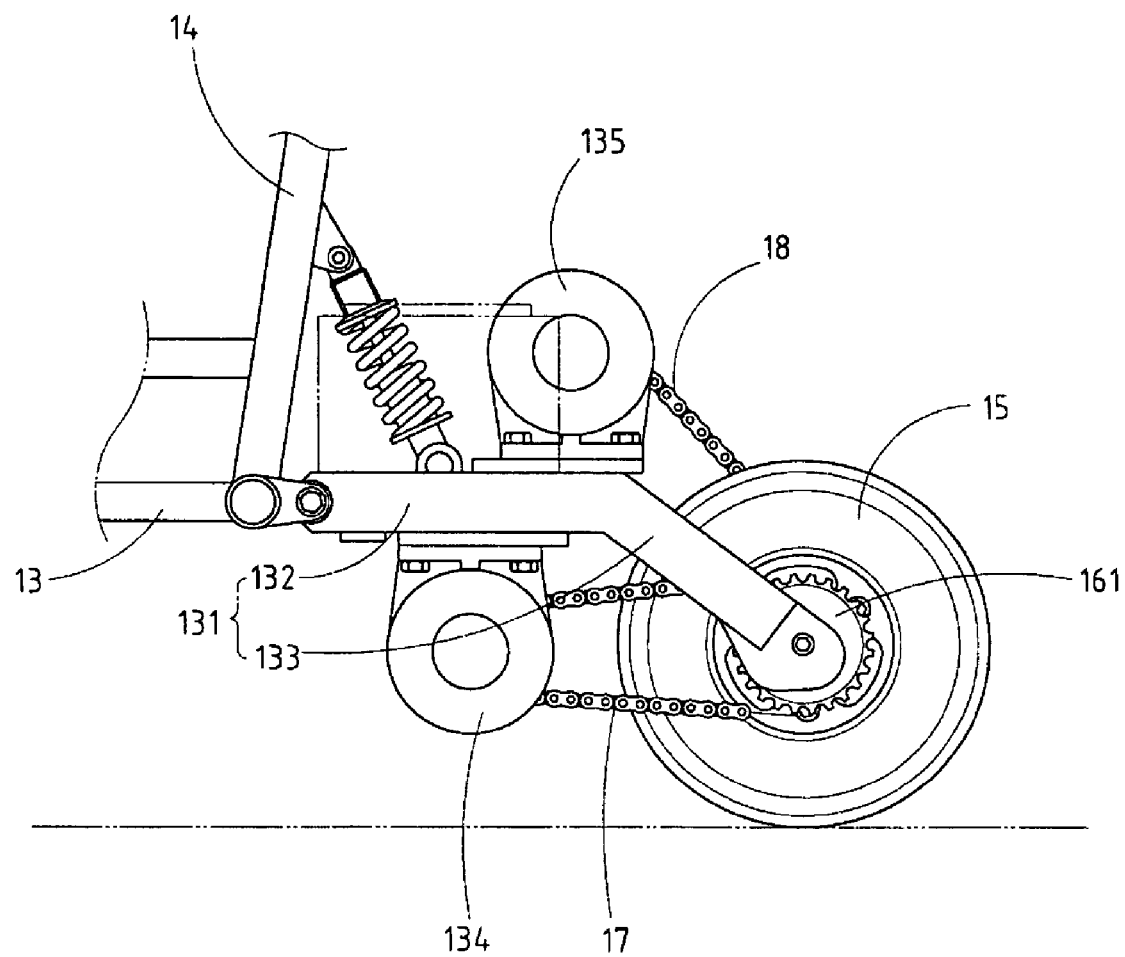
FIG. 3 shows a partial left side view of the preferred embodiment of the present invention.
Figure 4:
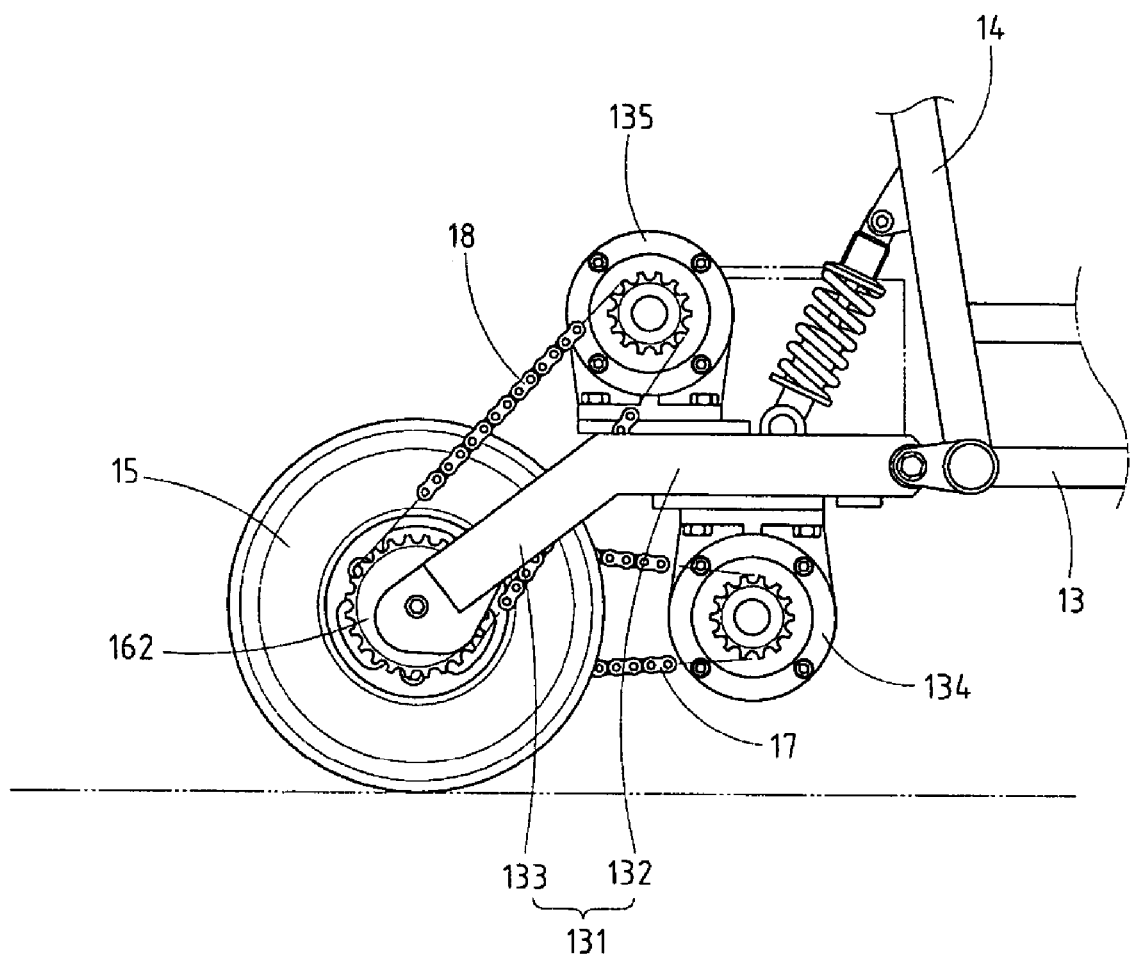
FIG. 4 shows a partial right side view of the preferred embodiment of the present invention.

As shown in FIGS. 1–4, an electric bicycle embodied in the present invention comprises a stem 10, a front fork 11, a front wheel 12, a frame 13, a seat 14, a rear wheel 15 mounted on an axle 16, a rear frame 131, and a driving mechanism mounted on the rear frame 131 for driving the rear wheel axle 16.

The rear frame 131 has a front segment 132 which is horizontally located, and a rear segment 133 extending slantingly from one end of the front segment 132. The rear wheel axle 16 is fastened to the rear segment 133.

The driving mechanism of the present invention comprises a first motor 134, a first sprocket 161, a first transmission member 17, a second motor 135, a second sprocket 162, and a second transmission member 18.

The first motor 134 is fastened with the horizontal front segment 132 of the rear frame 131. The first sprocket 161 is mounted on one end of the rear wheel axle 16 such that the first sprocket 161 is linked with the first motor 134 by the first transmission member 17. The one end of the rear wheel axle 16 is driven by the first motor 134 in conjunction with the first transmission member 17 and the first sprocket 161.

The second motor 135 is fastened to the horizontal front segment 132 of the rear frame 131. The second sprocket 162 is mounted on the other end of the rear wheel axle 16 such that the second sprocket 162 is linked with the second motor 135 by the second transmission member 18. In other words, the other end of the rear wheel axle 16 is driven by the second motor 135 in conjunction with the second transmission member 18 and the second sprocket 162.

As shown in FIGS. 1, 2, 3 and 4, the first transmission member 17 and the second transmission member 18 are respectively a drive chain.

The rear wheel axle 16 of the present invention may be provided at both ends thereof with a wheel having a grooved rim. The two wheels are respectively mounted on both ends of the rear wheel axle 16 in place of the two sprockets 161 and 162 described above. Accordingly, the first transmission member 17 and the second transmission member 18 are respectively a transmission belt, which runs in the grooved rim of the wheel.

The electric bicycle of the represent invention is propelled by the first motor 134 and the second motor 135, which are operated by a battery set (not shown in the drawings.)

It is therefore readily apparent that the horsepower of the electric bicycle of the present invention is significantly increased to enhance the operational efficiency and the performance of the electric bicycle.

The embodiments of the present invention described above are to be regarded in all respects as being illustrative and nonrestrictive. Accordingly, the present invention may be embodied in other specific forms without deviating from the spirit thereof. The present invention is therefore to be limited only by the scope of the following claims.

We claim:

1. An electric vehicle comprising:
    a rear frame;
    a rear axle fastened with the rear frame and having a first end and a second end;
    a rear wheel mounted on the rear axle; and
    a driving mechanism mounted on the rear frame and connected to both of the first and second ends of the rear axle for driving both of the first and second ends of the rear axle;

wherein said driving mechanism comprises:

a first motor mounted on the rear frame;

a first driven member mounted on the first end of the rear axle;

a first transmission member having a first portion mounted on said first motor and a second portion mounted on said first driven member to link said first driven member with said first motor;

a second motor mounted on the rear frame;

a second driven member mounted on the second end of the rear axle; and a second transmission member having a first portion mounted on said second motor and a second portion mounted on said second driven member to link said second driven member with said second motor; wherein said first transmission member is separated from said second transmission member, and said first driven member is separated from said second driven member so that said first transmission member and said first driven member are driven by said first motor, and said second transmission member and said second driven member are driven by said second motor respectively.

2. The electric vehicle as defined in claim 1, wherein said first driven member and said second driven member are respectively a sprocket; wherein said first transmission member and said second transmission member are respectively a drive chain.

3. The electric vehicle as defined in claim 1, wherein said first driven member and said second driven member are respectively a wheel having a grooved rim; wherein said first transmission member and said second transmission member are respectively a transmission belt whereby said transmission belt runs in said grooved rim of said wheel.

4. The electric vehicle as defined in claim 1, wherein said rear frame has a front segment which is located horizontally and a rear segment extending slantingly from one end of said front segment, said rear axle is fastened with said rear segment of said rear frame, said first motor is fastened with said front segment of said rear frame, and said second motor is fastened with said front segment of said rear frame.

* * * * *